United States Patent [19]

Meijer et al.

[11] Patent Number: 4,781,242

[45] Date of Patent: Nov. 1, 1988

[54] EXHAUST HEAT RECOVERY SYSTEM FOR COMPARTMENT HEATING

[75] Inventors: Roelf J. Meijer; Benjamin Ziph, both of Ann Arbor, Mich.

[73] Assignee: Volvo Flygmotor A.B., Trollhatten, Sweden

[21] Appl. No.: 23,781

[22] Filed: Mar. 9, 1987

[51] Int. Cl.$^4$ .................... F28D 15/02; F02N 17/06
[52] U.S. Cl. ........................ 165/32; 165/41; 165/104.21; 237/12.3 B; 60/320; 123/142.5 R
[58] Field of Search .................. 165/32, 96, 41, 51; 237/12.3 R, 12.3 A, 12.3 B, 12.3 C; 60/320; 123/142.5 R; 126/110 C

[56] References Cited

U.S. PATENT DOCUMENTS

| | | | |
|---|---|---|---|
| 2,028,260 | 1/1936 | Vernet | 165/32 |
| 3,927,651 | 12/1975 | Harrow et al. | 165/104.21 |
| 4,087,047 | 5/1978 | Wulf et al. | 237/12.3 B |

FOREIGN PATENT DOCUMENTS 3001667 7/1981 Fed. Rep. of Germany ........ 165/32

Primary Examiner—Albert W. Davis, Jr.
Attorney, Agent, or Firm—Harness, Dickey & Pierce

[57] ABSTRACT

An exhaust gas heat exchanger for transferring heat from the exhaust gases of an engine to its liquid coolant, thereby increasing the rate of heating of the coolant. The heat exchanger according to this invention provides a regulated rate of heat transfer despite changes in the temperature of the exhaust gases. The exchanger includes a heat pipe with an evaporator and condenser portion. The evaporator portion is exposed to exhaust gases; thus heating the working fluid in the heat pipe, and the condenser portion is in thermal communication with an engine coolant heater. In order to accommodate a broad range of exhaust gas temperature, the heat exchanger includes means for storing the working fluid such that the quantity of the working fluid transferring heat from the evaporator to the condenser portions can be varied. This system enables substantially all of the working fluid in a liquid phase to be removed from the evaporator (i.e. a complete drying out) when the temperature of the evaporator approaches the upper limit of its operating range.

18 Claims, 2 Drawing Sheets

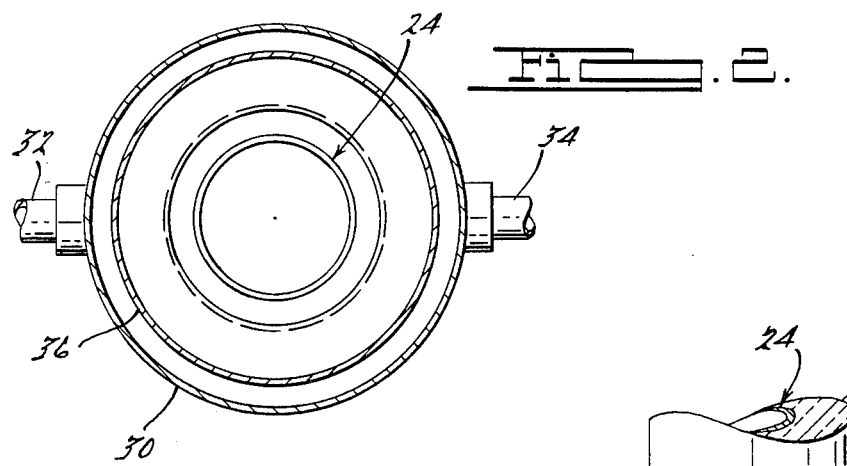
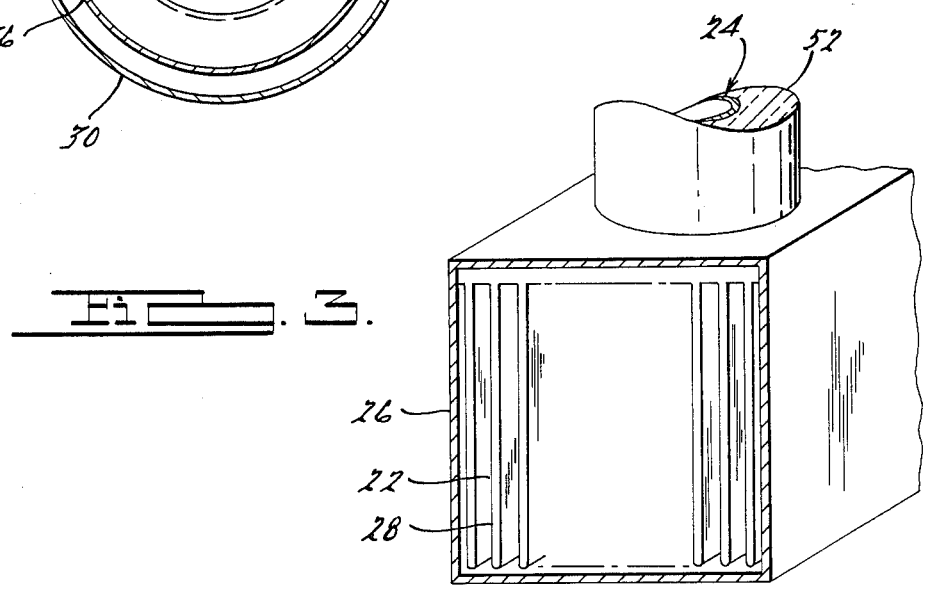
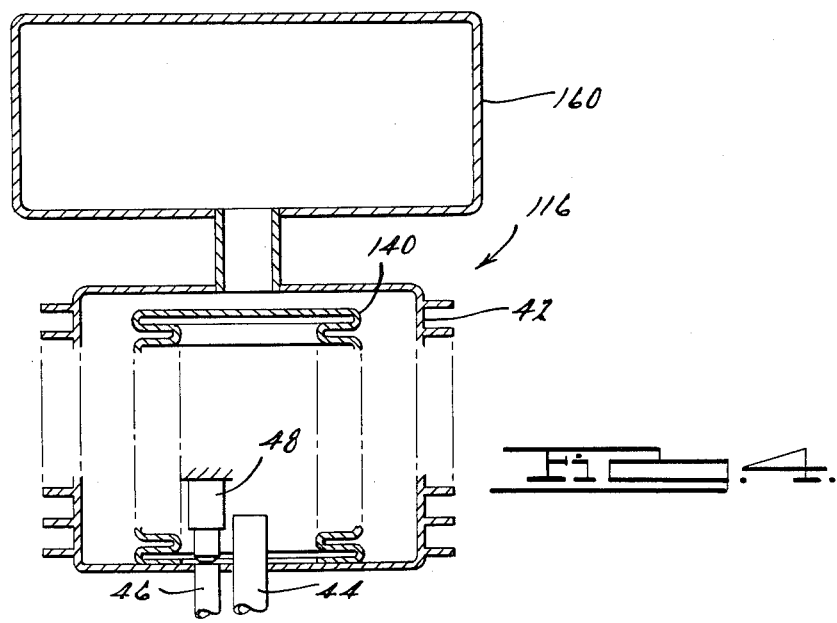

EXHAUST HEAT RECOVERY SYSTEM FOR COMPARTMENT HEATING

BACKGROUND AND SUMMARY OF THE INVENTION

This invention relates to a heat transfer system and particularly to one adapted for transferring heat from the exhaust gases of an internal combustion engine to its liquid coolant.

Most modern motor vehicles employ liquid cooling systems which remove waste engine heat to maintain the engine in a safe operating temperature range. In order to provide heated air for warming the vehicle passenger compartment and for defrosting, the heated coolant passes through a heat exchanger. The engine coolant system further stabilizes the operating temperature of the engine within a narrow range which is desirable in achieving performance, fuel economy, and exhaust emissions levels. The rate of heat transfer to the liquid coolant of the internal combustion engine coupled with the quantity and thermal characteristics of the coolant causes the temperature of the coolant to increase relatively slowly when the vehicle has been started after cold-soaking in low ambient temperature conditions. Accordingly, warm air for passenger compartment heating and windshield defrosting is not immeditely available. Consequently, the vehicle operator must often prestart the vehicle prior to using it in order to allow the coolant to reach a desired temperature. In addition to problems associated with occupant comfort and defrosting, the slow increase in coolant temperature adversely affects engine operation.

In view of the foregoing, there is a need for a system for increasing the rate at which liquid coolant of internal combustion engines is heated to a desired operating temperature.

One approach toward increasing the rate of temperature rise of engine coolant upon start-up is to transfer waste heat from the engine exhaust gases to the engine coolant. Heat pipe thermal transport systems enable heat energy to be transferred between a heat source and a remote heat sink with high efficiency, and therefore, are excellent candidates for such applications. Heat pipes are comprised of an enclosed vessel having separated evaporator and condenser sections. An external heat source supplies thermal energy to the evaporator section and a heat sink extracts heat from the condenser section. The heat pipe has a hollow interior cavity which is filled or lined with a wick of porous material. The interior of the heat pipe is charged with a heat transfer medium which vaporizes in the evaporator portion, and is transferred with its latent heat of evaporation to the condenser section where it condenses on the cooler surfaces, thus giving up its latent heat. The condensed medium is transferred back to the evaporator portion through the porous wick by capillary action and/or gravity.

Due to structural considerations, there are limits on the temperature ranges through which a heat pipe may operate. Temperatures much higher than the desired operating range of the heat pipe causes internal fluid pressures to increase to a level which could causes structural failure of the heat pipe. This limitation poses a significant design obstacle in designing a heat pipe system for transferring waste exhaust gas heat to engine coolant since exhaust gas temperatures vary widely, for example, over a range of 250° C. to 700° C.

One means of handling such temperature extremes is by choosing a working fluid which has a vapor pressure which does not exceed the upper pressure limit of the heat pipe at the highest temperature to which the heat tube would be subjected. Such a working medium, however, would have a very low vapor density at lower temperatures which would require an excessively large core diameter to provide the desirable thermal transport rate.

Another means of overcoming the previously described design challenges for heat pipe type systems would be controlling the heat input to the heat pipe evaporator portion by diverting portions of engine exhaust gas out of contact with the evaporator. This approach, however, would require the use of a mechanical valve in the exhaust gas stream. Such valves are undesirable due to reliability, cost, and other considerations.

Another approach for rapidly heating coolant is to allow the exhaust stream to freely deliver heat to a heat pipe evaporator portion and then dissipate any excess heat. This approach, however, is not viable due to the requirement to dissipate extremely high amounts of heat.

The system according to this invention achieves the above-mentioned desirable features and overcomes the shortcomings of the approaches described above by permitting portions of the heat pipe evaporator to boil dry as exhaust gas temperature increase. Such portions will reach exhaust gas temperature and will not thereafter participate in the heat transfer through the heat pipe. Accordingly, heat input through the heat pipe remains at a substantially constant level. This system provides a means for varying the amount of heat transfer medium which participates in the heat exchange process in the heat pipe by storing a quantity of the working fluid in condensated form when it is not needed. When exhaust temperatures increase or the rate of heat transfer to the coolant decreases, larger proportions of condensed working fluid are stored. Conversely, when exhaust gas temperatures are low and heat transfer rates to the coolant are high, a larger proportion (or all) of the working fluid is permitted to transfer heat between the evaporator and condenser.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 2 is a cross-sectional view taken along lines 2—2 of FIG. 1 particularly showing the configuration of the coolant heater assembly;

FIG. 3 is a partial cross-sectional and partial pictorial view of the exhaust gas heat exchanger shown in FIG. 1; and FIG. 4 is a cross-sectional view of an exhaust heat recovery system in accordance with a second embodiment of this invention wherein a buffer plenum is employed to maintain the heat pipe working medium at a desired pressure.

DETAILED DESCRIPTION OF THE INVENTION

Figure 1:
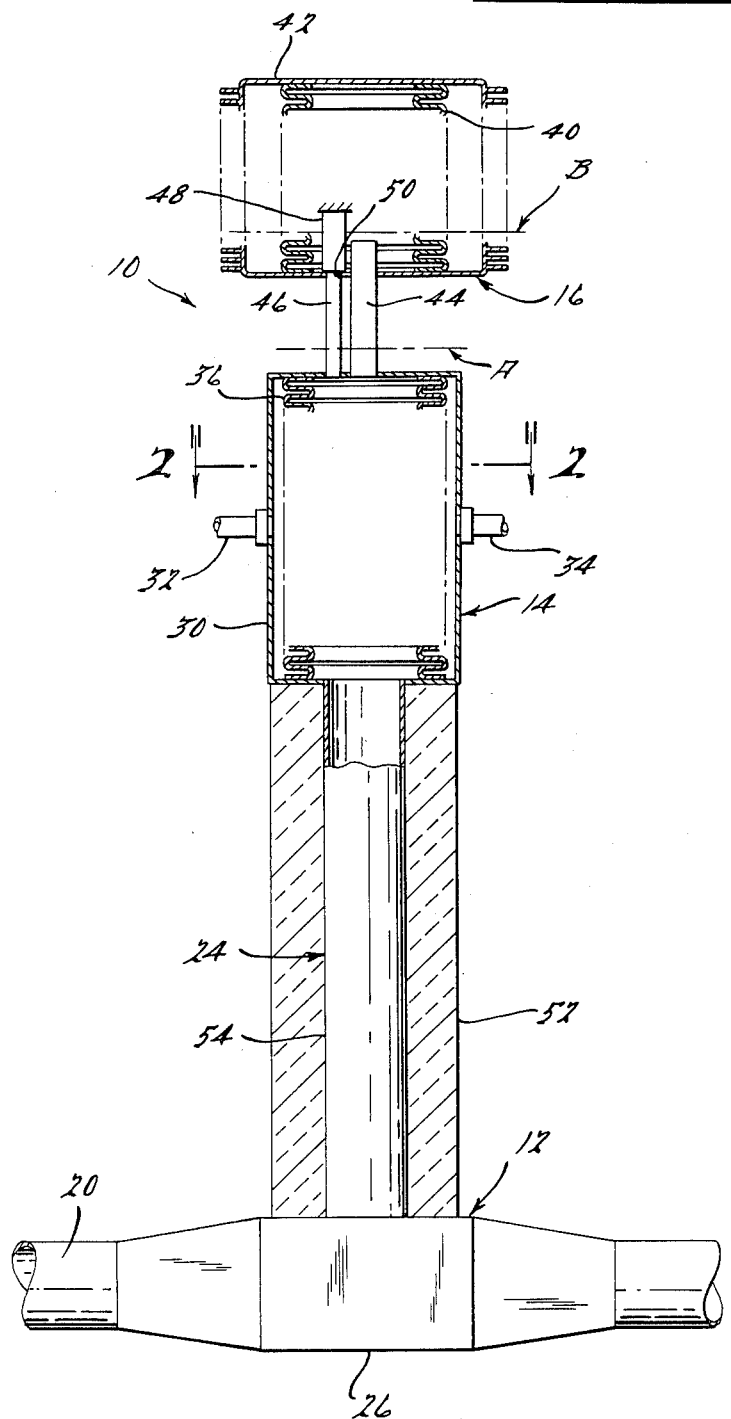
FIG. 1 is a schematic diagram of the exhaust heat recovery system in accordance with this invention.

An exhaust heat recovery system in accordance with a first embodiment of this invention is shown in FIGS. 1 through 3 and is generally designated by reference number 10. System 10 principally comprises exhaust heat exchanger assembly 12, coolant heat exchanger assembly 14, and thermal storage assembly 16.

Exhaust gases from an associated internal combustion engine (not shown) pass through exhaust pipe 20 which surrounds evaporator 22 of heat pipe 24. Evaporator 22 has a plurality of hollow fins 28, thereby providing a large surface area for enhanced heat transfer. A heat pipe having such configuration is described in U.S. Pat. No. 4,523,636 which is assigned to the assignee of this application and which is hereby incorporated by reference. FIG. 3 illustrates housing 26 which generally surrounds evaporator 22 to direct exhaust gases passing through exhaust pipe 20 into contact with the surface of evaporator 22.

Coolant heat exchanger assembly 14 includes housing 30 having coolant inlet 32 and coolant outlet 34. Heater 36 is part of heat pipe 24 and has a bellows-like externally corrugated configuration and is disposed inside housing 30. FIG. 2 illustrates that an annular gap is formed around heater 36 so that coolant flowing into inlet 32 is divided into two streams which flow around the heater to be discharged from outlet 34.

Elongated heat pipe section 54 connects evaporator 22 with heater 36. A layer of insulation 52 is provided to insulate pipe section 54, thus reducing the unwanted transfer of heat from that section.

Thermal storage assembly 16 includes canister 40, preferably having a corrugated or finned external surface which is enclosed by housing 42. Thermal storage assembly 16 and coolant heat exchanger assembly 14 collectively comprise the condenser of heat pipe 24. Canister 40 is sealed within housing 42, and a thermal storage medium such as an antifreeze-water mixture surrounds the canister. A pair of pipes 44 and 46 communicate the interiors of heater 36 and canister 40. Pipe 44 extends upwardly into the inside volume of canister 40, whereas pipe 46 opens within the lower surface of the canister. Thermally activated valve (i.e. thermostat) 48 senses the temperature within canister 40 and selectively opens or closes port 50 opening into pipe 46. Various types of thermally sensitive valves may be employed for thermally activated valve 48, such as a small bellows filled with ether.

An explanation of the operation of system 10 will be made with reference to FIGS. 1 through 3. At a desired operating design point, for example, an exhaust gas temperature of 250° C., the upper boundary of "diffussion zone" of the area within heat pipe 24 where condensation of working fluid occurs is located approximately at line A, shown in FIG. 1. In this condition, the mass of condensate returned to evaporator 22 is adequate to provide the desired heat transfer rate.

In the event that the exhaust gas temperature increases, for example, to 750° C, and/or the heat transfer rate from coolant heat exchanger assembly 14 is reduced, a means for reducing the effective quantity of heat pipe working fluid is provided. In such conditions, additional vapor is generated during a "drying out" of evaporator 22 (i.e. substantial elimination of liquid working fluid in that area), and the diffusion zone moves into thermal storage assembly 16, for example to line B, where the vapor is exposed to the cool wall surface of canister 40, causing it to condense while heating thermal storage assembly 16. During this process, thermally activated valve 48 senses the increased temperature of the working fluid vapor and closes port 50, thus trapping liquid working fluid within the lower portion of canister 40. Since this condensate is trapped in canister 40, it does not reach evaporator 22 to be vaporized. Thus, system 10 provides a means for reducing the effective quantity of working fluid so that a given heat transport rate may be maintained despite a wide temperature range of evaporator 22.

As the excess working fluid condenses in canister 40, the pressure drops within heat pipe 24 slightly, causing the diffusion zone to move downwardly toward point A. This action causes thermally activated valve 48 to cool such that it opens port 50 and permits an increased quantity of condensed working fluid to reach evaporator 22. Through this process, the position of the diffusion zone reaches an equilibrium state where the condensate flow admitted by thermally activated valve 48 is equal to the heat dissipation by the portion of the thermal storage assembly 16 between the bottom of thermal storage chamber 40 and the location of the diffusion zone. In the event that heat is not transferred to the coolant in heat exchanger assembly 14, a complete drying out of evaporator 22 will occur, causing substantially all of the working fluid to be trapped in thermal storage canister 40.

FIG. 4 illustrates a second embodiment of a heat exhaust recovery system in accordance with this invention. Thermal storage assembly 116 is modified through the addition of buffer plenum 160 which stores a non-condensable gas. Elements of assembly 116 which perform the same function as elements of the first embodiment are identified by like reference numbers. Canister 140 is in the form of a collapsible bellows, and accordingly, the pressure within buffer plenum 160 is maintained in the working fluid of the heat pipe. The use of buffer plenum 160 enables the pressure dependent properties of the working fluid to be maintained in a desired range with a particular working fluid.

While the above description constitutes the preferred embodiments of the present invention, it will be appreciated that the invention is susceptible to modification, variation and change without departing from the proper scope and fair meaning of the accompanying claims.

What is claimed is:

1. An exhaust gas heat exchanger for transferring heat from the exhaust gases of an engine to its liquid coolant, thus increasing the rate of heating of the coolant, said heat exchanger providing a regulated rate of heat transfer despite changes in the temperature of said exhaust gases, comprising:
   a heat pipe having an evaporator portion and a condenser portion, said evaporator portion exposed to said exhaust gases thereby heating a working fluid in said heat pipe, said condenser portion defining a coolant heater in thermal communication with said liquid coolant,
   a thermal storage canister for storing said working fluid whereby the quantity of said working fluid transferring heat from said evaporator portion to said condenser portion can be varied,
   conduit means for communicating said working fluid between said coolant heater and said thermal storage canister, a thermally activated valve for controlling the flow of working fluid from said storage canister to said heat pipe wherein, when said exhaust gas is at a low temperature, substantially all of said working fluid is exchanged between said evaporator portion and said coolant heater, and when said exhaust gas is at a high temperature, a portion of said working fluid condenses in said storage canister and said thermally activated valve regulates the return flow of said condensed working fluid to said heat pipe whereby said storage canister and said thermally activated valve vary the proportion of the total amount of said working fluid in said heat pipe which transports heat between said evaporator portion and said coolant heater in accordance with the temperature of said exhaust gases.

2. The exhaust gas heat exchanger according to claim 1 wherein said evaporator portion defines a plurality of separated hollow fins exposed to said exhaust gas.

3. The exhaust gas heat exchanger according to claim 1 wherein said coolant heater is surrounded by a first housing with a coolant inlet and a coolant outlet, whereby said coolant flows around said coolant heater.

4. The exhaust gas heat exchanger according to claim 1 wherein said conduit means includes a first conduit connecting said coolant heater with said storage canister and extending into the interior cavity of said storage canister, and a second conduit connecting said coolant heater with said storage canister and defining a port in lower surface of said storage canister, said thermally activated valve controlling the flow of working fluid through said port.

5. The exhaust gas heat exchanger according to claim 1 wherein said storage canister is surrounded by a jacket of heat absorbing material.

6. The exhaust gas heater exchanger according to claim 5 wherein said jacket is defined by a second housing surrounding said canister.

7. The exhaust gas heat exchanger according to claim 5 wherein said heat absorbing material is a liquid contained by said second housing.

8. The exhaust gas heat exchanger according to claim 1 further comprising a buffer plenum charged with a non-compressible gas for controlling the pressure of said working fluid in said heat pipe.

9. The exhaust gas heat exchanger according to claim 1 wherein said heater is positioned vertically above said evaporator portion and said canister is positioned vertically above said heater.

10. An exhaust gas heat exchanger for transferring heat from the exhaust gases of an engine to its liquid coolant, thus increasing the rate of heating of the coolant, comprising:

a heat pipe having an evaporator portion and a condenser portion, said evaporator portion exposed to said exhaust gases thereby heating a working fluid in said heat pipe, said condenser portion defining a coolant heater, said heater surrounded by a jacket of said liquid coolant, said condenser portion further defining a working fluid storage canister, conduit means for communicating working fluid between said coolant heater and said storage canister, and a thermally activated valve for controlling the flow of working fluid from said storage canister to said heat pipe wherein, when said exhaust gas is at a low temperature, substantially all of said working fluid is exchanged between said evaporator portion and said coolant heater, and when said exhaust gas is at a high temperature, a portion of said working fluid condenses in said thermal storage canister and said thermally activated valve regulates the return flow of said condensed working fluid to said heat pipe whereby said storage canister and said thermally activated valve vary the proportion of the total amount of said working fluid in said heat pipe which transports heat between said evapoartor portion and said coolant heater in accordance with the temperature of said exhaust gas.

11. The exhaust gas heat exchanger according to claim 10 wherein said evaporator portion defines a plurality of separated hollow fins exposed to said exhaust gas.

12. The exhaust gas heat exchanger according to claim 11 wherein said coolant heater is surrounded by a first housing with a coolant inlet and a coolant outlet, said first housing defining an annular coolant passage around said coolant heater.

13. The exhaust gas heat exchanger according to claim 10 wherein said conduit means includes a first conduit connecting said coolant heater with said storage canister and extending into the interior cavity of said storage canister, and a second conduit connecting said coolant heater with said storage canister and defining a port in a lower surface of said storage canister, said thermally activated valve controlling the flow of working fluid through said port.

14. The exhaust gas heat exchanger according to claim 10 wherein said storage canister is surrounded by a jacket of heat absorbing material.

15. The exhaust gas heat exchanger according to claim 14 wherein said jacket is defined by a second housing surrounding said canister.

16. The exhaust gas heat exchanger according to claim 14 wherein said heat absorbing material is a liquid contained by said second housing.

17. The exhaust gas heat exchanger according to claim 10 further comprising a buffer plenum charged with a non-compressible gas for controlling the pressure of said working fluid in said heat pipe.

18. The exhaust gas heat exchanger according to claim 10 wherein said heater is positioned vertically above said evaporator portion and said canister is positioned vertically above said heater.

* * * * *